Feb. 22, 1949. C. A. BIGELOW 2,462,459
AIR RESISTANT BRAKE FLAP
Filed Nov. 10, 1945
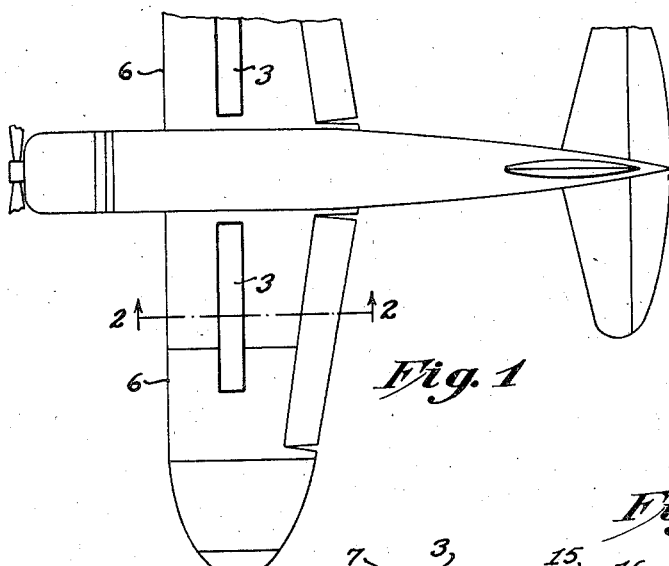
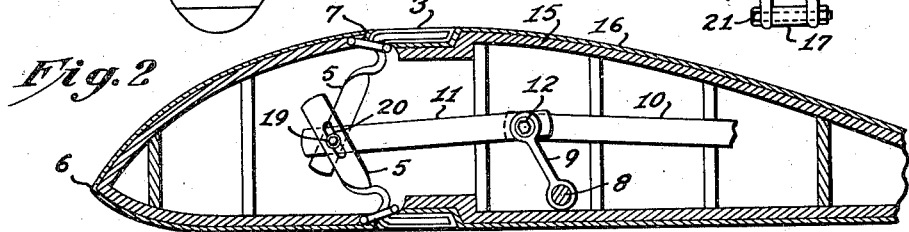
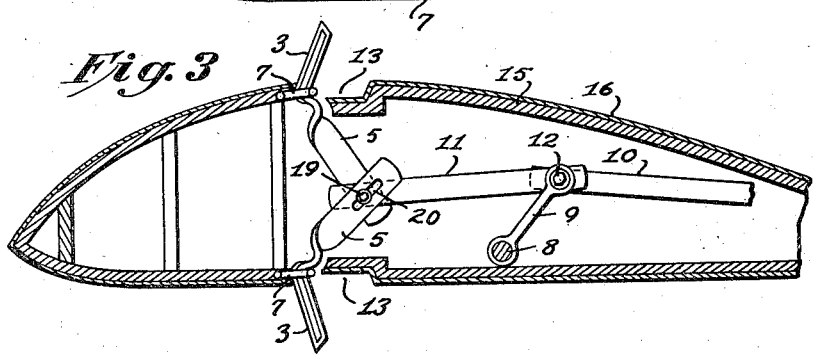
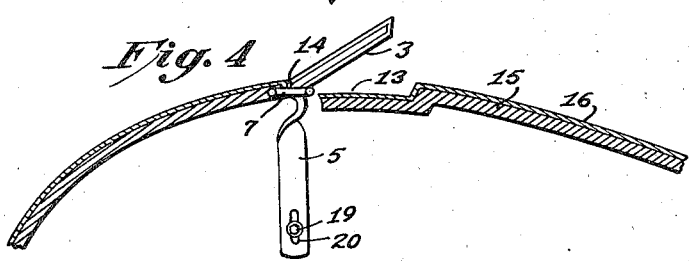
Inventor
Charles A. Bigelow Patented Feb. 22, 1949

2,462,459

UNITED STATES PATENT OFFICE 2,462,459

AIR RESISTANT BRAKE FLAP

Charles A. Bigelow, Houston, Tex.

Application November 10, 1945, Serial No. 627,935

2 Claims. (Cl. 244—113)

This invention relates to improvements in brake flaps on aircraft, particularly in the monoplane class, and are incorporated in the wing portion of the aircraft.

This particular air resistant brake flap, located as shown and made to operate as described; is new and an improvement over any other kind now used.

This particular air resistant brake flap assembly, is designed specifically to retard the landing speed of aircraft, when in the act of decending or landing; by creating an equalized resistance on both top and bottom of wing surface, wherein the top and bottom brake flaps are operatively connected and synchronized to operate at the same time; the length and width of said brake flaps will vary according to the size of aircraft, and is adaptable for any type of monoplane wing.

This particular combination of air resistant brake flap assembly is further identified as having a direct pull or push operation, combined with a leverage response to direct operation; the different monoplane wing types, as of low wing, mid-wing and top wing, will require different operational assembly.

One form of the invention is illustrated in the accompanying drawing, in which Fig. 1 shows an aircraft in the monoplane class, (in part), featuring the wing portion and showing the location of air resistant brake flaps.

Fig. 2, a cross section view on the line 2—2 of Fig. 1 showing the location of brake flaps in closed position, as in normal flight, fitting closely down into the recess provided therefor.

Fig. 3, a cross section view (same as Fig. 2), except, the air resistant brake flaps are shown open, and the operating device in the position relative thereto.

Fig. 4, a partial cross section, on an enlarged scale, similar to Figs. 2 and 3.

Fig. 5, showing part 7—7 to be a clevis type clamp.

Fig. 6, an end view of brake flap, illustrating the outer and inner sides as all one piece, bent and formed to be double, both ends or edges terminating below the radius bend.

Referring to Figs. 2—3—4 for further detail; part 8, a shaft located in alignment with brake flaps 3, substantially secured, so that shaft 8 can rotate, a connecting rod 9; one end shaped to fit around shaft 8 and means for securing to shaft 8, the other end shaped to have a hole for bolt 12, a pull rod or bar 10, one end to have a hole for bolt 12, the other end extending to where means for pulling or pushing and controlling rod 10, at any location effecting the position of brake flaps 3; said push or pull rod 10 shows broken line (for extension) for either manual operation, as in small aircraft, or mechanical operation in large aircraft; relay bar 11, has a hole at one end for bolt 12, and the other end has a hole for bolt 19; part 12, a bolt of size and length suitable, having a square head with washer and held in place by a lock nut with washer; part 19, a bolt of size and length suitable, having a square head with washer and held secure in place by a lock nut with washer, allowing for free movement of parts in operation: Thus, in the complete assembly of parts 8—9—11—12—19 and 5, we have one complete unit, there will be not less than four units and as many more as required for successful and substantial operation of any length brake flaps required for any size or type aircraft in the monoplane class; subject to the required force, applied to pull rod 10, that is connected to the complete assembly.

It will also be observed, as illustrated, that wherein a lever-arm 5, is designed to operate, there will be a break through the skin 16 and frame 15, in the depression or recess 13, said recess 13, positioned near the highest point of camber in the top wing surface from the leading edge, and parallel to the leading edge, one recess on each side, equal distance from the fuselage, as of the top wing surface and one recess on each side, equal distance from the fuselage, as of the lower wing surface; all four recesses 13, are equal in width and length, and equal distance from the leading edge; said recesses 13, are formed and provided for in the frame 15 and skin 16, of the top and bottom wing surface.

Figs. 4 and 6, show a side and end view of lever-arm 5, said lever-arm 5, made of substantial strap metal, considerably wider than its thickness, the proper length is bent to a predetermined angle, forming a radius at the bend, equal to the radius 14, that is formed in the recess 13, to receive the angle portion at bend of lever-arm 5, allowing for the skin thickness at radius formed bend of lever-arm 5; it will then be observed that lever-arm 5, has a length other than the described angle end, and that this length has a twist formed below the bend and formed radius 14, thereby presenting this portion of lever-arm 5, edge-wise to the source of operation; this portion of lever-arm 5, also has a slot 20, in the center of the width; thus, when the two corresponding opposite lever-arms 5—5, are connected together in conjunction with relay bar 11, they will have slidable clearance on bolt 19, pertaining to the arc course of the two connected lever-arms 5—5, when operated, as of opening or closing brake flaps 3.

The skin of said brake flaps 3, is formed by bending aluminum sheet metal or its equal; so that there will be a top and bottom surface, slightly tapered from radius formed edge 14 to rear edge, and so formed, that the top and bottom surface, after bending will terminate when inner and outer radius 14 are complete, said skin is substantially attached to lever-arms 5; then said brake flap 3, is secured into the recess 13, the formed radius 14 of brake flap 3, fitting closely into the formed radius 14 of the recess 13, provided in the frame 15 and skin 16, of the top and bottom wing surface; said brake flaps 3, are held securely in place by a clevis type clamp 7—7, said clevis clamp 7—7 moves slightly up and down with the operation of brake flaps 3, from closed to open or from open to closed; when brake flaps 3, are in closed position, as in normal flight, they conform to a smooth uninterrupted surface of airfoil resistance; then it will be recognized, by any one familiar with aircraft, that in operating the device to open said brake flaps 3, a positive equalized air resistance, will be created at the most advantageous place of airfoil resistances to the air force; therefore this resistance will substantially slow down the speed of the aircraft, when in the act of descending and landing.

Operating parts: One pull rod 10, connected to connecting rod 9, that is secured to shaft 8, will rotate shaft 8, to which all other connecting rods are secured; the above named parts as, 8—9—10—11—12 and 19 are located to operate within the wing structure.

It will be noted that pull rod 10, is shown cut off, because small aircraft can and probably will operate the device and brake flaps 3, manually, by hand or foot control, no two aircraft of different make will have the same construction; larger aircraft may operate and control the device and brake flaps 3, by mechanical means therefore no predetermined operating and control method can be specified.

I am aware that there must be means of force or power applied, to operate said brake flaps, and that prior to my invention, there was and is now, means for communicating the required force or power to operate my invention; therefore I do not claim a complete combination broadly, but:

I claim:

1. In an airplane of the monoplane class, air resistant brake flaps; lever arms supporting said flaps, said brake flaps being pivotally supported in the wings of said air craft; a radius formed in each of said lever arms at the base of each said brake flap, said wings having a frame and a skin covering said frame; a recess or depression formed in the wings to receive said brake flaps, said recess being formed in the wings at the highest point of camber from the leading edge of the top wing surface, a corresponding recess in the bottom wing surface located in vertical alinement with the top surface recess, all said recesses being equal distance and in parallel alignment from the leading edge; said recesses located and formed to have a radius in the forward side of recess equal to the formed radius of said lever-arm.

2. The device as claimed in claim 1 including a clevis type clamp forming the pivotal support of said brake flaps at each said lever-arm adjacent the radius formed therein, means within the wing interconnecting corresponding pairs of upper and lower lever-arms, link means pivotally connected to said interconnecting means and means to operate said link means whereby the brake flaps on the upper and lower surfaces of the wing may be raised and lowered simultaneously; substantially as described.

CHARLES A. BIGELOW.

REFERENCES CITED

The following references are of record in the file of this patent:

UNITED STATES PATENTS

| Number | Name | Date |
|---|---|---|
| Re. 20,075 | Barnhart | Aug. 25, 1936 |
| 1,520,292 | Kray | Dec. 23, 1924 |
| 1,545,808 | Ajello | July 14, 1925 |
| 1,829,607 | O'Malley | Oct. 27, 1931 |
| 2,332,465 | Lee | Oct. 19, 1943 |
| 2,344,945 | Knox | Mar. 28, 1944 |

FOREIGN PATENTS

| Number | Country | Date |
|---|---|---|
| 705,499 | Germany | Apr. 30, 1941 |
| 762,400 | France | Jan. 22, 1934 |